March 17, 1936. F. K. BEZZENBERGER Re. 19,890

METHOD OF AND APPARATUS FOR MAKING METALLIC WALLS Orig. 1,506,966

Original Filed April 17, 1924 5 Sheets-Sheet 1

Inventor

Fred K. Bezzenberger

By Maurg Cameron, Lewis Hickam

Attorneys

March 17, 1936. F. K. BEZZENBERGER Re. 19,890

METHOD OF AND APPARATUS FOR MAKING METALLIC WALLS

Original Filed April 17, 1924 5 Sheets-Sheet 2

Inventor

Fred K. Bezzenberger

By Mauro Cameron Lewis & Kirkham

Attorneys

March 17, 1936. F. K. BEZZENBERGER Re. 19,890

METHOD OF AND APPARATUS FOR MAKING METALLIC WALLS

Original Filed April 17, 1924 5 Sheets-Sheet 3

Inventor

Fred K. Bezzenberger

By Mauro, Amerson, Lewis & Kirkham

Attorneys

March 17, 1936. F. K. BEZZENBERGER Re. 19,890

METHOD OF AND APPARATUS FOR MAKING METALLIC WALLS

Original Filed April 17, 1924 5 Sheets-Sheet 4

Inventor

Fred K. Bezzenberger

By Mauro, Cameron, Lewis & Herkam

Attorneys

March 17, 1936. F. K. BEZZENBERGER Re. 19,890

METHOD OF AND APPARATUS FOR MAKING METALLIC WALLS

Original Filed April 17, 1924 5 Sheets-Sheet 5

Inventor

Fred K. Bezzenberger

By Mauro, Cameron, Davis & Hickam

Attorneys

Reissued Mar. 17, 1936

Re. 19,890

UNITED STATES PATENT OFFICE 19,890

METHOD OF AND APPARATUS FOR MAKING METALLIC WALLS

Fred K. Bezzenberger, Cleveland Heights, Ohio, assignor, by mesne assignments, to The Fulton Sylphon Company, Knoxville, Tenn., a corporation of Delaware Original No. 1,506,966, dated September 2, 1924, Serial No. 707,265, April 17, 1924. Application for reissue May 28, 1926, Serial No. 112,407

57 Claims. (Cl. 153—73)

The present invention, relating, as indicated, to a method of and apparatus for making metallic walls, is more particularly directed to an improved method of corrugating tubular metallic walls to produce expansible and collapsible bellows for various uses. One of the principal objects of the invention is the provision of a method for corrugating bellows by a fluid pressure which may be very rapidly and economically performed, and which will leave the metal of the corrugations produced in the tubular body of a uniformly graded temper. A further object of the invention is the provision of apparatus for carrying out the above method, which may be rapidly and easily operated, and which is practically automatic in its operation, so that the product is uniform in character. To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating however, but one of various ways in which the principle of the invention may be used.

In said annexed drawings:—

Figure 1:
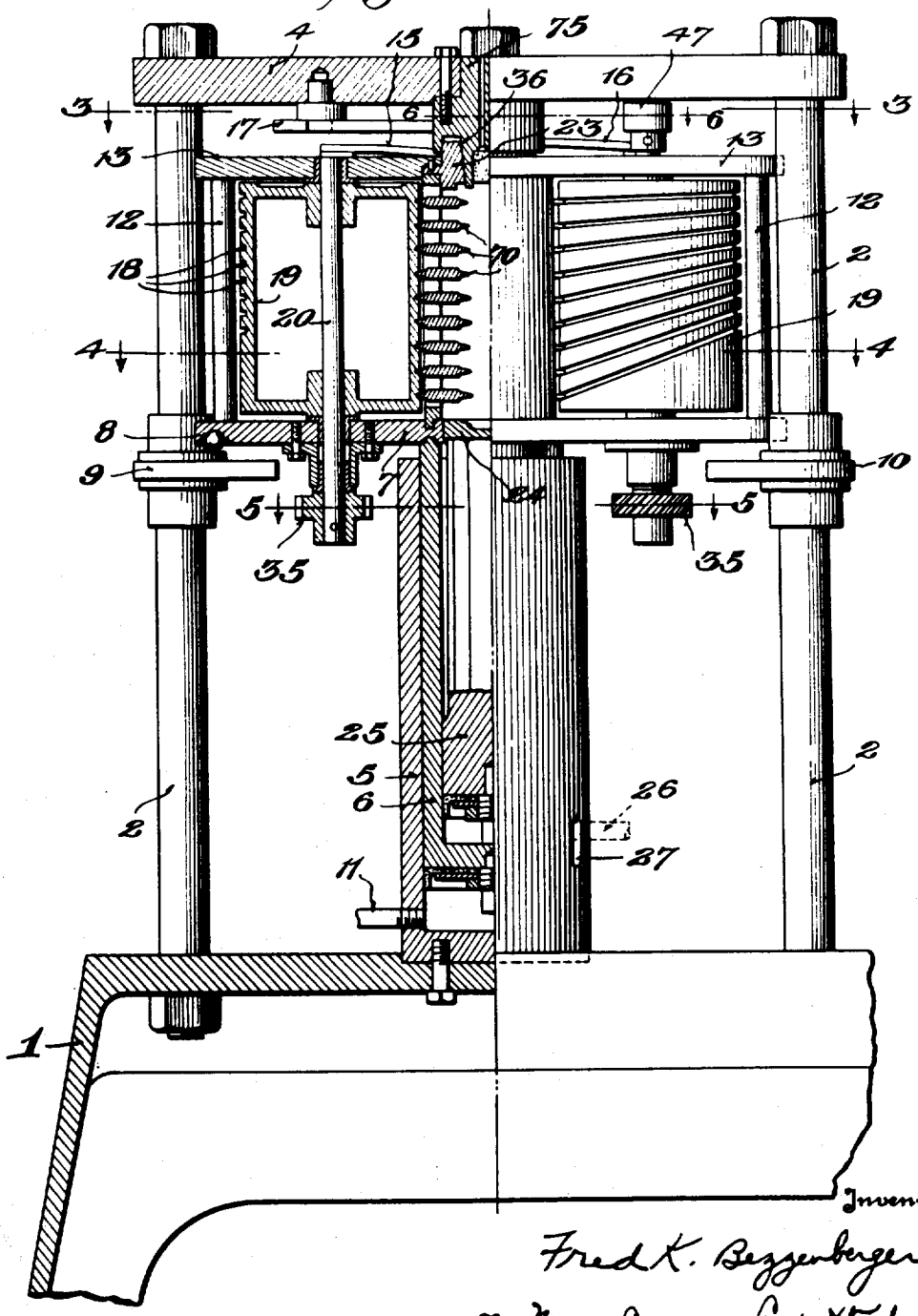
Figure 2:
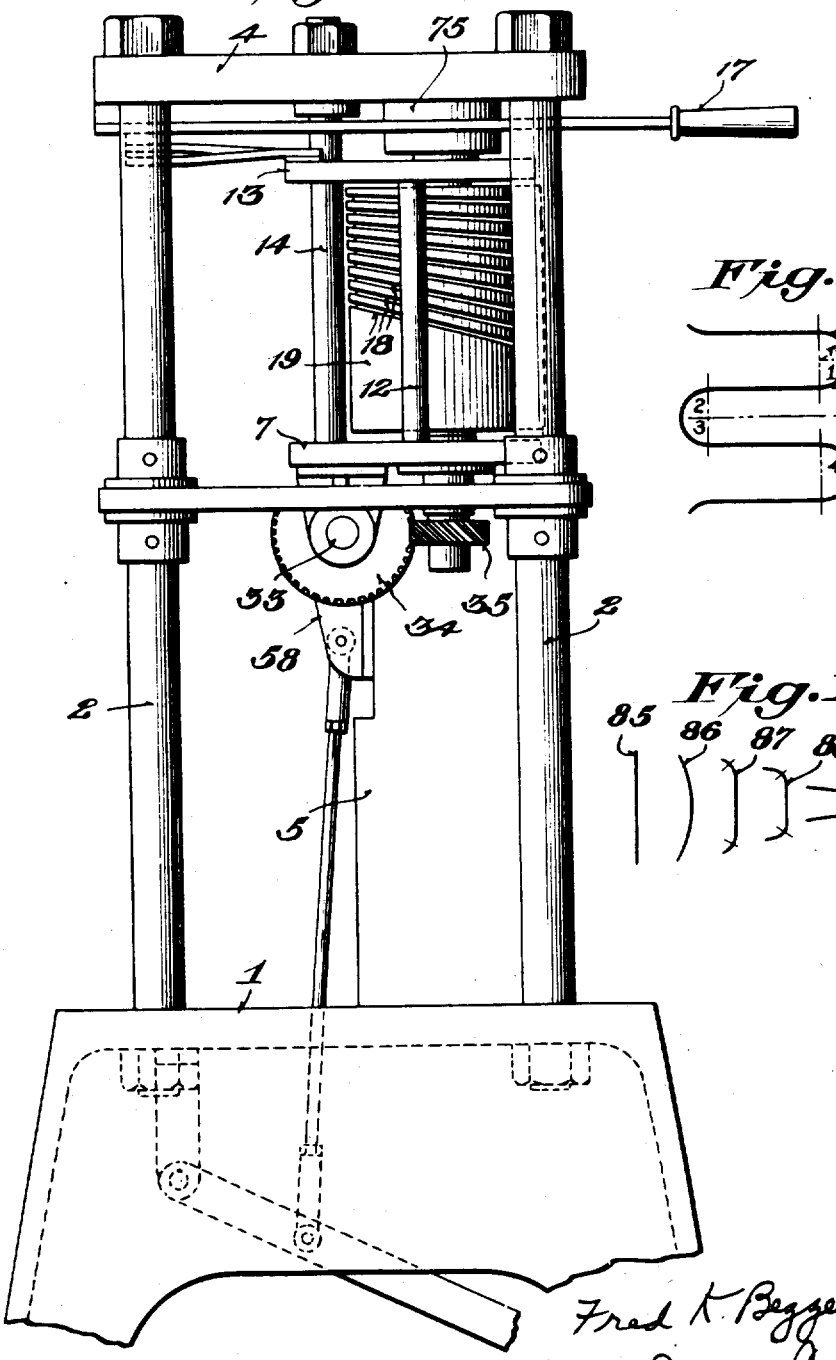
Figure 12:
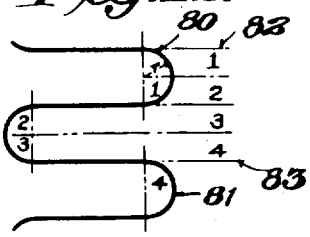
Figure 13:
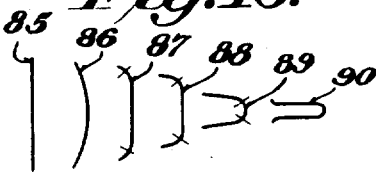
Figure 3:
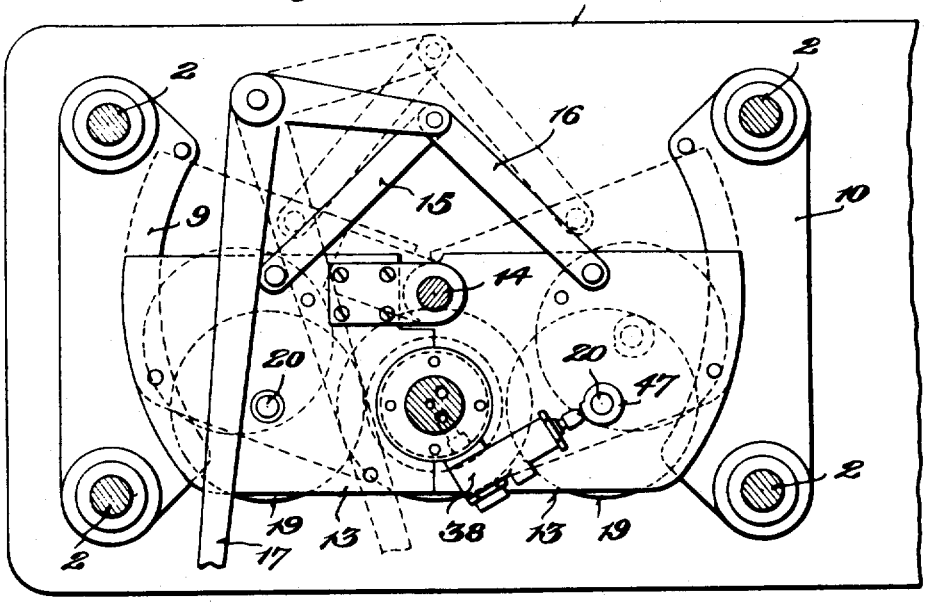
Figure 4:
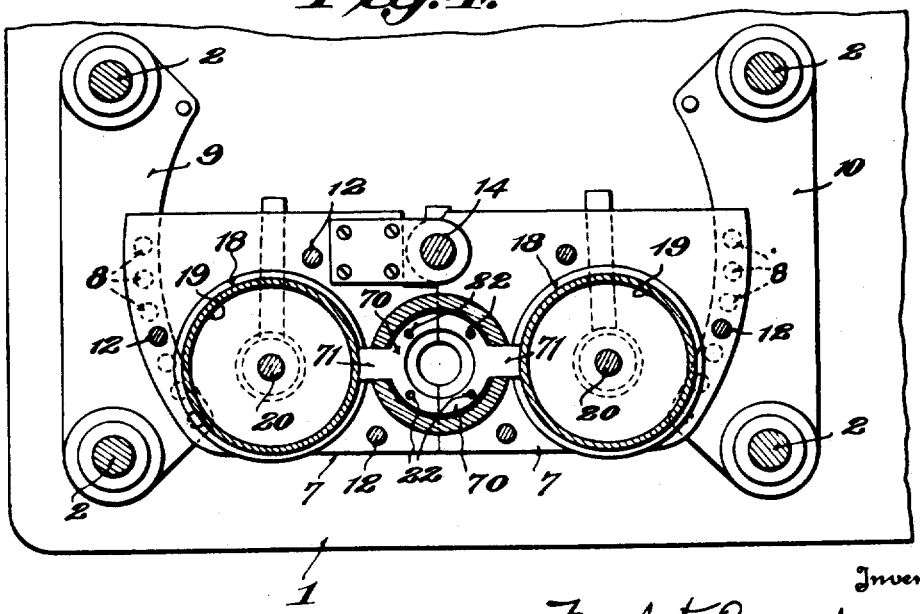
Figure 5:
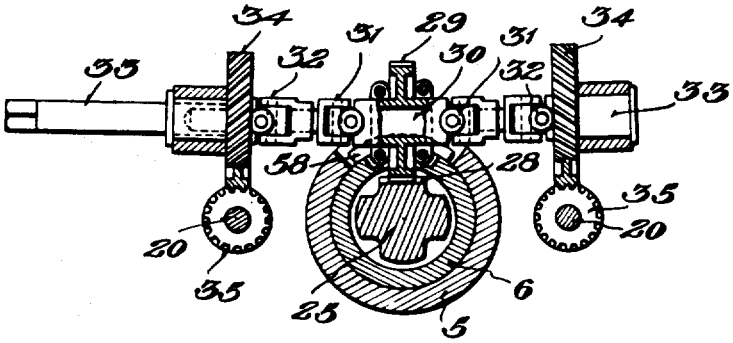
Figure 6:
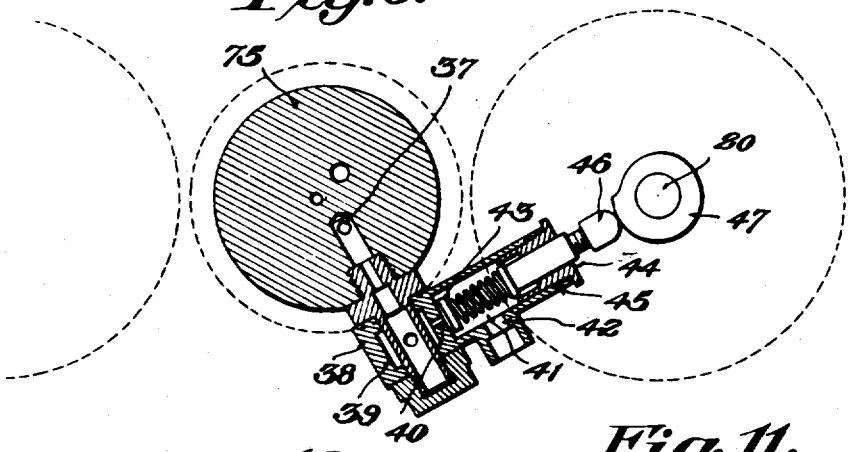
Figure 10:
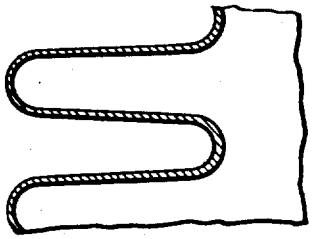
Figure 11:
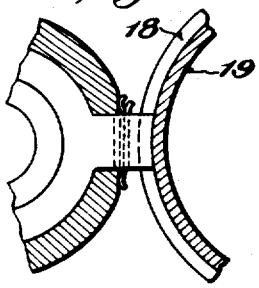
Figure 7:
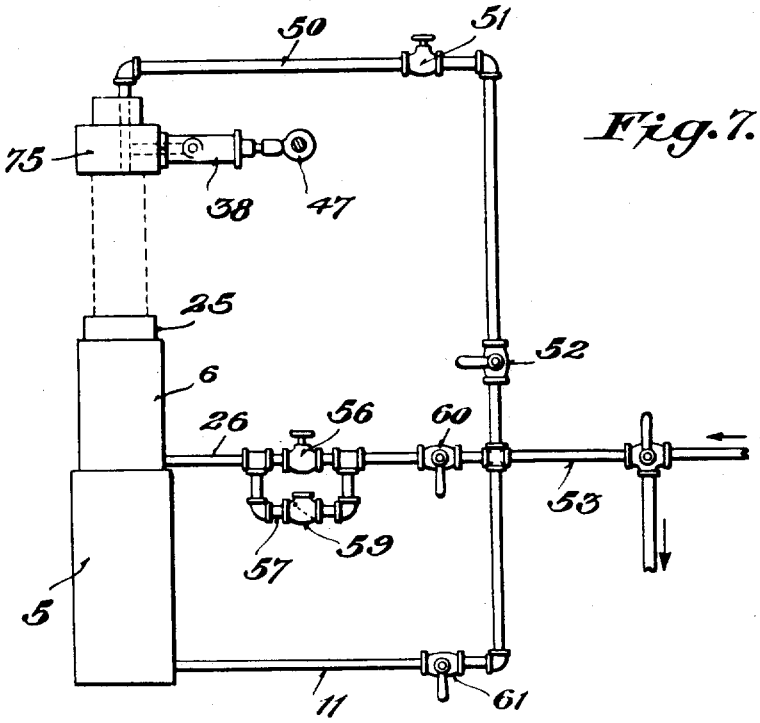
Figure 8:
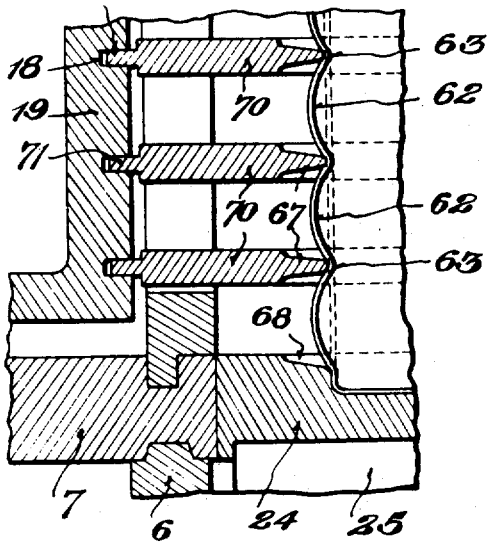
Figure 9:
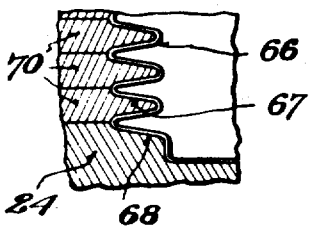

Figure 1 is a front elevation partially in section of my improved apparatus; Fig. 2 is a side elevation partially in section of the apparatus; Fig. 3 is a horizontal section on the line 3—3, Fig. 1; Fig. 4 is a similar section on the line 4—4, Fig. 1; Fig. 5 is a section on the line 5—5, Fig. 1; Fig. 6 is a section on the line 6—6, Fig. 1; Fig. 7 is a side elevation more or less diagrammatic in character showing the controlling means for operating the apparatus; Fig. 8 is a vertical section through a portion of the die and tubular wall after the first stage of expansion of the wall; Fig. 9 is a similar view showing the wall after it has been completely corrugated; Fig. 10 is an enlarged vertical section through a finished corrugated tube showing the varying thickness therein; Fig. 11 is a section showing the engagement of the ring and operating means therefor; Fig. 12 is a diagrammatic view illustrating the ratio between the original spacing of the dies and the radius of convolution of the bellows produced therein; and Fig. 13 is a similar diagrammatic view illustrating the various changes in form of a section of the wall between the points engaged by the dies during the expanding operation.

The general construction of my apparatus can best be seen in Fig. 1, in which there is shown a base 1, upon which are mounted a series of parallel vertical supports 2 connected by means of an upper plate 4. Fixed centrally to the base member 1 is a cylinder 5, which is open at its upper end, and in which there is reciprocably mounted a piston 6. The upper end of this piston is adapted to engage against a plate 7, which is formed in two halves, each of which may be supported at its inner portion on the upper end of the piston 6, or at its outer portion upon ball bearings 8 which may roll on supporting platforms 9 and 10, each of which is fixed to the supports 2. Fluid pressure may be admitted below the piston 6 through a conduit 11, see Figs. 1 and 7.

The two plates 7 and 7 are each a part of the framework, each plate being connected, by means of vertical spacing members 12 with other horizontal plates 13. Each of the two frameworks oscillates about a shaft 14, this oscillation or opening of the two portions of the framework being effected by means of links 15 and 16 and a bell crank lever 17, which are shown in Fig. 3. The frame is shown in its closed position in Figs. 3 and 4.

Mounted between the plates 7 and 13 are a series of spacing rings 70, which are shown in their initial position in Fig. 1, and which are maintained in spaced relation by means of extensions 71 which engage in spiral cam grooves 18 formed in two drums 19, which are rotatably mounted and fixed to shafts 20 which are journaled in the upper plate 13 and the lower plate 7, and which extend through and below the lower plate. The spacing rings 70 are slidably mounted on guide rods 22, (see Fig. 4) which are fixed to a die head 23, carried in the upper plates 13, and to the lower plates 7. The forming rings 70 and the die head 23 are all semi-circular and open when the two halves of the plates 7 and 13 are swung away from each other and are closed when these plates are swung together and in the relation shown in Figs. 1, 3 and 4.

The piston 6 is hollow, and mounted within this piston is a second piston 25 which engages the die base 24 and acts to move this base vertically upward upon actuation of the piston 25. Fluid pressure may be admitted to the interior of the piston 6 below the piston 25 through a conduit 26 extending through a slot 27 in the wall of the cylinder 5 to a port (not shown) in the wall of the cylinder 6. The piston 6 has only a limited movement, and the slot 27 is of sufficient length to maintain connection between the port in the cylinder wall 6 and the conduit 26 in all positions of the piston 6.

The piston 25 is provided with a rack member 28 which is exposed through slots formed in the members 5 and 6 (see Fig. 5), this rack engaging a gear 29 on a horizontal transverse shaft 30. This shaft 30 is mounted in a fixed position and is connected by means of double universal joints 31 and 32 to the shafts 33, upon which are carried gears 34 engaging with gears 35 mounted on the lower ends of the shafts 20. The shafts 20 are, of course, moved with the plates 7 when the latter are opened, but will remain in mesh with the gears 34 by reason of the movement allowed the shafts 33 through the universal connection with the driving shaft 30. Mounted in the upper plate 4 is a sealing member 75 provided with a tapered end 36 adapted to fit snugly within a correspondingly tapered opening in the die head 23. Extending through the member 75 is a relief passage 37 connected to a relief valve 38, which is shown in Fig. 6. The relief valve 38 has a chamber 39 which communicates to the atmosphere through passage 40, chamber 41 and port 42, the passage 40 being normally closed by means of a spring-loaded valve 43. The spring is loaded by means of a sleeve sliding over the stem of the valve 43 and having a flange engaging the end of the spring, this sleeve then being reciprocably mounted in a removable plug 44 secured in the end of the valve casing 45. At its outer end this sleeve carries a cam follower 46 which is engaged by a cam 47 mounted on an extension of the shaft 20 in the right cam drum 19. In this way the cam is operated in synchronism with the operation of the cam drum and the relief valve is opened during the rotation of the cam drums, which in turn is timed by the lifting of the inner piston 25.

The operating means for the apparatus are shown diagrammatically in Fig. 7. In this figure there is shown the fixed cylinder 5, the outer piston 6, the inner piston 25 and the conduits 11 and 26, connected respectively to the fixed cylinder 5, and to the outer piston 6. There is also shown a conduit 50 leading to the opening in the die head for admitting fluid pressure to the interior of the tube which is to be corrugated. In the conduit 50 is a valve 51, which may be used either for closing this line off entirely or for graduating the pressure flowing through the line, and an operating valve 52 for admitting fluid pressure to this conduit from the main supply conduit 53, to which all of the conduits 11, 26 and 50 are connected. In the conduit 26 is a graduating needle valve 56, of the same type as the valve 51, and a by-pass conduit 57, in which there is a check valve 59 for allowing a rapid reverse flow, this check valve closing against the direct flow into the piston. There is also in the line 26 an operating valve 60 and a similar valve 61 in the line 11.

I corrugate metallic tubes in the following manner. In their initial condition the pistons 6 and 25 are both in their lowered positions and the die head 23 is below and out of contact with the plug 75. The two dies or plates are open. A tube is now inserted between the forming rings 70 and is rested upon the bottom plate or die 24. Its upper end is first introduced between the adjacent but spaced beveled surfaces 36 on the die head and plug. The die is now closed by operating the bell crank lever 17. The valve 61 is then opened and fluid pressure is introduced below the piston 6, forcing this piston upwardly and engaging the die head 23 against the plug 75 with the upper end of the tube clamped therebetween and sealed against any leakage of liquid therethrough.

The valve 52 is then opened and fluid pressure is introduced within the tube and the pressure allowed to increase until the wall of the tube is given an initial set, which is shown in Fig. 8. That is, the metal of the tube wall is bulged out at the points 62 between the inner beveled edges 63 of the spacing rings 70. During the initial setting operation the spacing rings are maintained against movement and the metal in the tube wall is drawn and a temper is induced in each of the bulges. The amount of temper will vary between the points of the tube which lie against the rings to the center of the bulges, the greatest temper being induced at the point of maximum stretch of metal which is at the plane that is equidistant between the rings 70.

The second stage of the operation is effected by maintaining or slightly lessening the pressure within the tube, and by simultaneously permitting fluid pressure below the piston 25 by opening the valve 60. The internal pressure on the tube does not increase during the second stage of the operation, but remains practically constant, and fluid must be vented from the inside of the tube as the tube is collapsed by the upward movement of the piston 25. During this second stage of the operation the following actions are taking place: First, the pressure inside of the tube is maintained at initial pressure and is then allowed to remain constant through the operation of the relief valve 38. Second, the spacing rings are being brought closed together, although their equidistant relation is still being maintained, this action being effected by the rotation of the cam drums through the gearing on the rack from the piston 25. Third, the piston 25 is rising and is collapsing the tube in exact time with the decrease in the spacing of the rings, and in time also with the relief of the fluid pressure inside of the tube. When the rings have been brought into contact, as shown in Fig. 9, the form of the corrugated wall is as there shown, the tube having been forced outwardly into corrugations 66, which are in contact with the beveled faces 67 on the spacing rings 70. The base 24 is formed with a beveled surface 68, which corresponds to one-half of a corrugation, and this member 24 is of course moved upwardly, but maintained with the same spacing from the next adjacent ring as the spacing between any two adjacent rings during this portion of the operation. When the operation is completed the fluid pressure within the cylinder is pumped back to a reservoir, as is also the pressure below the pistons 25 and 6. The die may then be opened and the corrugated tube or bellows removed. The operation may then be repeated.

I have found that not only the success of the method described, but also, the shape and depth of the corrugations, and the resilient character of the bellows, is dependent, other conditions being equal, on the ratio between the distance between the inwardly projecting crests of the forming rings at the beginning of the operation (which I will call the initial point-to-point setting), and at the end of the operation, (which I will call the final point-to-point setting). The stretches involved in the operation described are two, and vary in their relation to each other as the diameter of the bellows being formed changes.

First in importance is the stretch due to the increase in diameter from the tube diameter to the bellows diameter. This stretch, which I will call the circumferential stretch, obviously decreases, for a constant depth of convolutions, as the diameter of the bellows being formed increases. This stretch is always positive. The second stretch, which I will call longitudinal stretch, is that which occurs by reason of a change of length in direction parallel to the axis of the tube, one corrugation only being considered. This stretch is determined by the total lineal cross-section length of one corrugation and the point-to-point initial setting. In most cases this value is negative, that is, the initial setting is of such magnitude that the length of tube allowed for the formation of one convolution is greater than the cross-sectional lineal length of the corrugation. This is made necessary by the volume of metal flow usually occurring in making the small size bellows, for the circumferential stretch. The reduction of the longitudinal stretch to a negative value allows sufficient metal to flow and compensate for these high circumferential stretches, which would otherwise burst the tube. With bellows of three inches outside diameter this value becomes positive, and with larger sizes, the value increases to compensate for the decrease in circumferential stretch while inducing in the metal sufficient cold work to effect suitable resiliency in the product.

Because of the complex character of the shapes produced it is most convenient to combine these two stretches, circumferential and longitudinal, and express the induction of cold work in terms of the reduction in thickness due to the increase in area of the section of tube allowed for one corrugation.

To this end the following equation may be employed:—

$$\frac{100[(A-C+1.14B)(\pi C+A)]-\pi CL}{\pi CL}=\text{per cent increase in area per convolution.}$$

in which

A—the radius of the outside of the bellows in question,

B—the radius of the bends and is the same for both inner and outer bends,

C—the radius of the tube,

L—the point-to-point initial setting of the rings of the die.

If the known values, determined from my present practice, be substituted in the equation, I find that the reduction in thickness of the metal, due to its total increase in area, is 14%. Assuming 14% reduction determined in this way to be good practice and allowing myself from 5% to 25% for variations I may desire to produce, I have calculated from this equation the data necessary for the production of bellows of other outside diameters, from .400 to 100.75 inches.

POINT TO POINT FINAL SETTING

*6–10 times radius of convolutions*

| (C) Tube | | | (L) Point to point setting | | | (B) Convolution | | |
|---|---|---|---|---|---|---|---|---|
| Dia. | Rad. | Cir. | Init. | Final | Ratio | Depth | Lin. length | Rad. |
| .250 | .125 | .785 | .183 | .040 | 4.6 | .075 | .151 | .005 |
| .250 | .125 | .785 | .200 | .040 | 5.0 | .075 | .151 | .005 |
| .250 | .125 | .785 | .168 | .040 | 4.2 | .075 | .151 | .005 |
| .6875 | .344 | 2.16 | .460 | .125 | 3.7 | .187 | .446 | .015 |
| .6875 | .344 | 2.16 | .498 | .125 | 4.0 | .187 | .446 | .015 |
| .6875 | .344 | 2.16 | .419 | .125 | 3.35 | .187 | .446 | .015 |
| 1.000 | .500 | 3.14 | .625 | .1875 | 3.3 | .250 | .553 | .03125 |
| 1.000 | .500 | ------- | .680 | .1875 | 3.6 | ------- | ------- | ------- |
| 1.000 | .500 | ------- | .570 | .1875 | 3.0 | ------- | ------- | ------- |
| 1.375 | .6875 | 4.32 | .750 | .250 | 3.0 | .3125 | .696 | .03125 |
| 1.375 | .6875 | 4.32 | .898 | .250 | 3.6 | .3125 | .696 | .03125 |
| 1.375 | .6875 | 4.32 | .693 | .250 | 2.7 | .3125 | .696 | .03125 |
| 1.375 | .6875 | 4.32 | .500 | .250 | 2.0 | .3125 | .696 | .03125 |
| 1.375 | .6875 | 4.32 | .500 | .250 | 2.0 | .230 | ------- | ------- |
| 3.000 | 1.500 | 9.42 | .750 | .250 | 3.0 | .344 | .759 | .03125 |
| 3.000 | 1.500 | 9.42 | .816 | .250 | 3.25 | ------- | .759 | ------- |
| 3.000 | 1.500 | 9.42 | .682 | .250 | 2.7 | ------- | .759 | ------- |
| 100. | 50. | 314.1 | .722 | .3125 | 2.3 | 3.75 | .821 | .03125 |
| ------- | ------- | ------- | .784 | .3125 | 2.5 | ------- | ------- | ------- |
| ------- | ------- | ------- | .659 | ------- | 2.1 | ------- | ------- | ------- |

POINT TO POINT FINAL SETTING

*6–10 times radius of convolutions*

| (A) Bellows | | | Stretch (linear) | | Percent increase in area |
|---|---|---|---|---|---|
| Dia. | Rad. | Circ. | Circ. | Long. | |
| .400 | .200 | 1.256 | 60.0 | −17.5 | 14 |
| .400 | .200 | 1.256 | 60.0 | −24.5 | 5 |
| .400 | .200 | 1.256 | 60.0 | −10.1 | 25 |
| 1.062 | .531 | 3.335 | 54.4 | −3.0 | 14 |
| 1.062 | .531 | ------- | 54.4 | −10.4 | 5 |
| 1.062 | .531 | ------- | 54.4 | +6.0 | 25 |
| 1.500 | .750 | 4.710 | 50.0 | −11.5 | 14 |
| ------- | ------- | ------- | 50.0 | −18.7 | 5 |
| ------- | ------- | ------- | 50.0 | −3.0 | 25 |
| 2.000 | 1.000 | 6.28 | 45.4 | −7.2 | 14 |
| 2.000 | 1.000 | ------- | 45.4 | −22.5 | 5 |
| 2.000 | 1.000 | ------- | 45.4 | +1.9 | 25 |
| 2.000 | 1.000 | ------- | 45.4 | +39.2 | 70 |
| 2.000 | 1.000 | ------- | 45.4 | ------- | ------- |
| 3.688 | 1.844 | 11.58 | 23.0 | +1.2 | 14 |
| ------- | ------- | ------- | 23.0 | −7.0 | 5 |
| ------- | ------- | ------- | 23.0 | +11.3 | 25 |
| 100.75 | 50.375 | 316.4 | .73 | +13.7 | 14 |
| ------- | ------- | ------- | .73 | +4.7 | 5 |
| ------- | ------- | ------- | .73 | +24.6 | 25 |

MINIMUM POINT-TO-POINT FINAL SETTING (4×*Rad. of convolution*)

| Init. | Final | Ratio |
|---|---|---|
| .183 | .020 | 9.1 |
| .200 | .020 | 10.0 |
| .168 | .020 | 8.4 |
| .460 | .060 | 7.7 |
| .498 | .060 | 8.3 |
| .419 | .060 | 7.0 |
| .625 | .125 | 5.0 |
| .680 | .125 | 5.4 |
| .570 | .125 | 4.6 |
| .750 | .125 | 6.0 |
| .898 | .125 | 7.2 |
| .683 | .125 | 5.5 |
| .500 | .250 | 2. Hollerith, |
| .500 | .250 | 2. Hollerith, |
| .750 | .125 | 6.0 |
| .816 | .125 | 6.5 |
| .682 | .125 | 5.4 |
| .722 | .125 | 5.8 |
| .784 | .125 | 6.3 |
| .659 | .125 | 5.3 |

In these calculations I have used the depths of convolutions which now normally characterize these products, but I recognize that by my process I can vary the depth of convolutions by varying the initial point-to-point setting of the rings of the die. In these calculations I have set the tube diameter, the bellows diameter and the radius of convolution, and have calculated the initial point-to-point setting with a view to showing the importance of its relation to the final point-to-point setting, which relation is the subject of some of my claims. The determination of the point-to-point setting requires explanation. Obviously, the minimum point-to-point setting is four times the radius of the convolutions.

In Fig. 12 I have shown two convolutions 80 and 81. One complete convolution may be considered as included between the upper and the lower lines running at right angles from the convolutions in this figure, namely, the lines 82 and 83. The final setting of the rings is with their minimum diameters, that is, their inner edges, spaced by the distance between the two planes 82 and 83. The distance between these two lines is four times the radius R of each of the bends of each corrugation, since the outer corrugation is twice the radius R, which must be added to twice the radius of the inner corrugation, which is also R.

Since the radius of convolution of bellows from one inch outside diameter up is about .03125 or 1/32 inch, the point-to-point final setting would be 1/8 inch.

The maximum point-to-point final setting is determined by the character of the bellows, and is not definite. There is a maximum value for the point-to-point final setting of the rings for every bellows, at which, when removed from the die, the bellows so partially formed can be collapsed to a true bellows without irregular distortions. For the average product, this value for the point-to-point final setting is from six to ten times the value for the radius of convolutions. At 10, dependent on the radius, the probability is that the product will be irregular. Using 10 as a high limit, the ratio for my present product would be $$\frac{750}{10\times.03125}=2.4$$

Using the maximum point-to-point final setting which is safely workable, that is, six to ten times the radius of convolution, gives the maximum ring thickness, which is highly desirable from a mechanical standpoint. On the other hand, minimum point-to-point final setting, four times radius of convolution, may very well be worked out.

Allowing 10% either way for variations I may desire in the stretch imparted to the metal, I therefore claim as my invention the use of the process described when the value for the ratio obtained by dividing the point-to-point initial setting by the point-to-point final setting lies between 2.25 and 10.0.

The metal in the corrugations made by my improved method is graduated in its temper from the crest of the inwardly extending corrugation to that of the outwardly extending corrugation. Under the following conditions, which I have found to give a very satisfactory product, Material of tube, 80–20 brass,
Thickness of tube, .0075",
Initial spacing of rings, .750",
Final spacing of rings, .250",
Average pressure during forming, 350 lbs.

I produce a convolution 5/16 inch deep, the inner extending corrugation of which has a temper equivalent to that resulting from a 10% reduction, and the outer extending corrugation has a temper equivalent to that resulting from about 20% reduction. Between these two points the temper varies as evenly as can be determined microscopically.

It will be clear that all of the work necessary to induce convolutions in a straight tube is performed, by my process, without annealing, whereas, in present practice, approximately one-fifth of the actual reduction occurs after the last anneal and is therefore effective in inducing resiliency. This limitation on the amount of cold working which can be given these bellows by rolling lies in the localization of the effect of its rolls, whereas, with my process, the effect is more evenly distributed throughout the whole convolution.

In Fig. 13 I have shown a section 85 of the tube wall in its original condition, which is then expanded outward through the various forms shown at 86, 87, 88, 89 and 90 to the finished corrugation. The initial expansion produces a fairly regular expansion and hence drawing or stretching of the metal throughout the longitudinal distance between the initial condition of the two adjacent rings. When the section 86 is further expanded into the form 87 the central portion of this section is increased in diameter and is hence stretched or worked more than the upper and lower portions of this section of the wall, the portion which is additionally stretched being included between the lines shown on these figures. The same action is true when the section 87 is expanded into the section 88, and is also true when this section is expanded into that shown at 89 and at 90, so that a gradual increase in the stretching or working of the metal is produced, which is a minimum at the bends of the inner corrugations and is a maximum at the bends at the outer corrugations, and varies substantially uniformly therebetween.

Since the radial planes are subjected to stretch and compression it is obviously advantageous to have them tempered.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:—

1. In a method of making corrugated hollow metallic walls, the steps which consist in mounting a tubular wall within a series of spaced forming rings, inducing an initial pressure within said wall sufficient to expand the same outwardly between said rings and thereby establishing a uniformly graded temper in the metal of such expanded portion, increasing from the point of contact of said wall with said rings to the point of maximum expansion of the portion of said wall between said rings, and then further expanding the portions of said wall between said rings while collapsing said wall longitudinally, thereby progressively increasing the temper of each portion of the wall between its point of contact with the ring and the point of maximum expansion of said wall.

2. In apparatus of the character described, the combination of a partible die including two series of cooperating partible forming rings partible as a unit, means normally maintaining said rings equidistantly spaced from each other, and means for progressively collapsing said rings while maintaining the same in equidistant relation.

3. In apparatus of the character described, the combination of a partible die including two series of cooperating partible forming rings adapted to encircle a tube, synchronizing controlling means engaging each of such two series of rings, said means being adapted to progressively collapse said rings while maintaining the same in equidistant relation.

4. In apparatus of the character described, the combination of a partible die including two series of cooperating partible forming rings, each of said series of rings being provided with extending portions, two cam drums provided with a series of spiral surfaces, each engaging one of said rings, and means for simultaneously operating said cam drums to progressively collapse said rings while maintaining the same in equidistant relation.

5. In apparatus of the character described, the combination of a partible die including two series of cooperating partible forming rings, a plunger movable at right angles to the plane of said rings, means engaging said rings and normally maintaining the same in equidistantly spaced relation, said means being positively interconnected with said movable plunger and operated to progressively collapse said rings during longitudinal movement of said plunger.

6. In apparatus of the character described, the combination of a partible die including two series of partible spaced forming rings and a partible frusto-conical die head, and means for sealing against the inner surface of said head of the open end of a tube disposed within said head and rings.

7. In apparatus of the character described, the combination of a partible die including two series of partible spaced forming rings and a partible cylindrical die head, and means for sealing against the inner surface of said head of the open end of a tube disposed within said head and rings, said means including a tapered member movable relatively to said die head.

8. In apparatus of the character described, the combination of a partible die including a series of partible rings, means normally maintaining said rings in equidistantly spaced relation, other means for progressively collapsing said rings while maintaining the same in equidistant relation, said rings and means being adapted to maintain a ratio between the initial spacing of the contacting points between said rings and the final distance between contacting points on said rings greater than 2¼ to 1.

9. In apparatus of the character described, the combination of a partible die including a series of partible rings, means normally maintaining said rings in equidistantly spaced relation, other means for progressively collapsing said rings while maintaining the same in equidistant relation, said rings and means being adapted to maintain a ratio between the initial spacing of the contacting points between said rings and the final spacing between the same contacting points on said rings no greater than 10 to 1.

10. In apparatus of the character described, the combination of a partible die including two series of cooperating forming rings adapted to encircle a tube, and means positively engaging and controlling the spacing of said rings, said means maintaining said rings in predetermined spaced relation during the parting of said die.

11. In apparatus of the character described, the combination of a partible die including two series of cooperating forming rings adapted to encircle a tube, and means positively engaging and controlling the spacing of said rings, said means preventing relative movement of said rings during the parting of said die.

12. In a method of making corrugated hollow metallic walls, the steps which consist in radially expanding a tube wall between spaced dies into corrugations while simultaneously axially collapsing such tube during such radial expanding operation a distance sufficient to more than compensate in the final length of the tube wall measured along an elemental longitudinal line for the increase in length produced by such radial expansion.

13. In a method of making corrugated hollow metallic walls, the steps which consist in radially expanding a tubular wall between a plurality of spaced dies into corrugations and collapsing each two adjacent dies axially of said tube a distance such that the initial axial distance between the points of contact of said dies with said tube walls is not less than two and one-quarter times the final distance, while simultaneously collapsing said tube axially sufficiently to contract its total length measured along an elemental surface line.

14. In a method of making a metallic bellows from a tube in a single continuous operation, the steps which consist in disposing a tube concentrically within spaced axially collapsible rings, expanding the wall of said tube radially outwardly by internal pressure into bulges engaging said rings therebetween, and then simultaneously expanding the wall of said tube further outwardly between said rings while collapsing said rings and the corrugations being formed in said tube wall.

15. In a method of making a metallic bellows from a tube in a single continuous operation, the steps which consist in disposing a tube concentrically within spaced axially collapsible rings, applying an internal hydraulic pressure within said tube and expanding the wall thereof outwardly between said dies sufficiently to produce shallow corrugations engaging said dies therebetween, and then simultaneously expanding the wall of said tube outwardly between said rings while collapsing said rings and the corrugations being formed in said tube wall.

16. In apparatus of the character described, the combination of a plurality of split axially movable forming rings adapted to encircle a tube, and means positively engaging said rings on either side of the split therein, said means acting to simultaneously axially move said rings in either direction.

17. In apparatus of the character described, the combination of a plurality of split axially movable forming rings adapted to encircle a tube, separate means engaging said rings on opposite sides of the same, and other means causing said first-named means to axially move said rings in unison.

18. In apparatus of the character described, the combination of a partible die, including a series of partible rings adapted to receive a tube within the same, a movable base member mounted to move axially within said partible rings to collapse the tube disposed therein, means adapted to collapse said rings while maintaining the same in equidistant relation, and means synchronizing the movement of said base and said rings.

19. In apparatus of the character described, the combination of a partible die, including a series of partible rings adapted to receive a tube within the same, means adapted to exert fluid pressure within said tube to expand the same between said rings, a base member mounted to move axially within said rings, and means operable upon movement of said base member, said means engaging and collapsing said rings.

20. In a method of making expansible and collapsible corrugated hollow metallic walls, the steps which include mounting a tubular wall within spaced forming rings, inducing an initial pressure within said wall sufficient to expand the same outwardly between said rings and thereby establishing a graded temper in the metal of such expanded portion, and then further expanding the portion of said wall between said rings while positively collapsing said rings longitudinally of said wall, thereby progressively increasing the temper of the portion of the wall between its contact with the rings and the maximum expansion of said wall.

21. In a method of making expansible and collapsible corrugated hollow metallic bellows, the steps which include mounting a tubular wall within spaced forming rings, inducing an initial pressure within said wall sufficient to expand the same outwardly between said rings and thereby establishing a graded temper in the metal of such expanded portion, and then further expanding the portion of said wall between said rings while controlling the collapse of said rings and exerting a thrust on said wall in the direction of its axis, thereby progressively increasing the temper of the portion of the wall between its contact with the rings and the maximum expansion of said wall.

22. In a method of making expansible and collapsible corrugated hollow metallic bellows, the steps which include mounting a tubular wall within spaced forming rings, inducing an initial pressure within said wall sufficient to expand the same outwardly between said rings while rigidly restraining said rings against axial movement during said expansion of the tube, and then while said rings are movable axially of the tube further expanding the portions of said wall between said rings while exerting a pressure on said wall internally thereof.

23. In a method of making expansible and collapsible corrugated hollow metallic bellows, the steps which include mounting a tubular wall within spaced forming rings, inducing an initial pressure within said wall sufficient to expand the same outwardly between said rings while rigidly restraining said rings against axial movement during said expansion of the tube, and then while said rings are movable axially of the tube further expanding the portions of said wall between said rings by internal pressure and a thrust on said wall in the direction of its axis.

24. In an apparatus of the character described, the combination of a partible die including two series of cooperating partible forming-ring sections adapted to encircle a tube, means for simultaneously and positively moving each series of ring sections axially of the tube, and means for synchronizing the movements of said last-named means.

25. In an apparatus of the character described, the combination of a partible die including two series of cooperating partible forming-ring sections adapted to encircle a tube, means for simultaneously and positively moving each series of ring sections axially of the tube, means for exerting an end thrust on said tube, and means for synchronizing the movements of said means for moving the ring sections and said means for exerting an end thrust on said tube.

26. In an apparatus of the character described, the combination of a plurality of axially-movable forming rings adapted to encircle a tube, means for positively moving said rings axially of the tube, means for exerting an end thrust on the tube, and means for synchronizing the movement of said last-named means with the means for moving said rings.

27. In an apparatus of the character described, the combination of a plurality of axially-movable forming rings adapted to encircle a tube, means for positively moving said forming rings in the direction of the axis of said tube, and means for simultaneously exerting an end thrust on said tube.

28. In an apparatus of the character described, the combination of a plurality of axially-movable forming rings adapted to encircle a tube, and means for positively moving said forming rings in the direction of the axis of the tube.

29. In a method of making expansible and collapsible corrugated hollow metallic bellows, the step which includes radially expanding a tubular wall into a corrugation between a pair of spaced dies while simultaneously collapsing said tube during said expanding operation a distance sufficient to more than compensate in the final length of the tube wall, measured along an elemental longitudinal line, for the increase in length that would otherwise be produced by said radial expansion.

30. In a method of making expansible and collapsible corrugated hollow metallic bellows, the step which includes radially expanding a tubular wall between spaced movable dies while positively moving said dies toward each other and simultaneously exerting an end thrust on said tube.

31. In a method of making expansible and collapsible corrugated hollow metallic walls, the step which includes radially expanding a tubular wall between spaced movable dies while positively moving said dies toward each other.

32. In a method of making expansible and collapsible corrugated hollow metallic walls, the step which includes radially expanding a tubular wall into a relatively deep narrow corrugation between spaced movable dies while positively moving said dies toward each other during said expanding operation and simultaneously exerting an end thrust on said tubular wall to aid the flow of said metal into said corrugated form.

33. In a method of making expansible and collapsible metallic bellows, the steps which include disposing a tube within axially-movable forming rings, subjecting the interior of said tube to fluid pressure sufficient to cause said tube to tightly engage said rings while rigidly holding said rings against axial displacement, and while permitting axial movement of said rings and exerting fluid pressure radially of said wall, subjecting said tube to axial pressure to cause the metal to flow into corrugated form.

34. In a method of making expansible and collapsible metallic bellows, the steps which include disposing a tube within axially-movable forming rings, subjecting the interior of said tube to fluid pressure, and while continuing said fluid pressure, positively moving said rings relatively toward each other.

35. In a method of making expansible and collapsible metallic bellows, the steps which include positioning a tubular wall within relatively movable spaced forming rings and flowing the metal of said wall into corrugated form by the combined action of internal pressure and an axial thrust on said wall while positively moving said forming rings relatively toward each other.

36. In a method of making expansible and collapsible metallic bellows, the steps which include positioning a tubular wall within relatively movable spaced forming rings, subjecting the tube internally to fluid pressure to bulge said tube between said rings, and applying an axial pressure to said tube sufficient to shorten the longitudinal elements of said tube while aiding the fluid pressure to flow the metal into corrugated form.

37. In a method of making expansible and collapsible metallic bellows, the steps which include positioning a tubular wall within relatively movable spaced forming rings, applying hydrostatic pressure interiorly of said tube, and positively moving said forming rings relatively toward each other.

38. In a method of making expansible and collapsible metallic bellows, the steps which include positioning a tubular wall within relatively movable spaced forming rings, applying hydrostatic pressure interiorly of said tube, exerting an end thrust on said tube, and positively moving said forming rings relatively toward each other in synchronism with the collapse of said tube.

39. In a method of making expansible and collapsible metallic bellows, the steps which include positioning a tubular wall within relatively movable spaced forming rings, applying an internal fluid pressure to said tube to cause said tube to tightly engage said rings, and effecting a controlled movement of said forming rings relatively toward each other while maintaining them equally spaced.

40. In a method of making expansible and collapsible metallic bellows, the steps which include positioning a tubular wall within relatively movable spaced forming rings, applying an internal fluid pressure to said tube to cause said tube to tightly engage said rings, and effecting a controlled movement of said forming rings relatively toward each other in equally spaced relation and simultaneously exerting an end thrust on said tube to aid the flow of the metal.

41. In a method of making metallic bellows from a tube by fluid pressure, the steps which consist in mounting a tube concentrically within a series of spaced axially-movable forming rings, initially establishing a fluid pressure within said tube sufficient to expand the tube wall slightly between said rings, and then collapsing said rings and simultaneously exerting an axial pressure to collapse the tube into corrugations lying between said rings.

42. In a method of making a metallic bellows from a tube by fluid pressure, the steps which consist in mounting a tube concentrically within a series of spaced axially-movable forming rings, initially establishing a fluid pressure within said tube sufficient to expand the tube wall slightly between said rings while maintaining said rings stationary, and then collapsing said rings while simultaneously exerting a pressure against the ends of said tube to collapse the same into corrugations lying between said rings.

43. In a method of making a metallic bellows from a tube by fluid pressure, the steps which consist in mounting a tube concentrically within a series of spaced axially-movable forming rings and between a fixed support at one end and a movable ram at the other end, establishing an initial fluid pressure within said tube and expanding the wall radially while maintaining said rings stationary, and then progressively and positively collapsing said rings axially while exerting a pressure of said ram sufficiently to over-balance the internal pressure in said tube and to flow the metal of the tube wall in the forming corrugations to compensate for the increasing diameter of said corrugations.

44. In a method of making expansible and collapsible corrugated tubular metal walls, the steps which include positioning a tube within relatively movable spaced forming rings and forcing the metal of the tube into a corrugation of substantially final depth by the combined action of interior fluid pressure and a pressure acting axially of the tube, while positively moving said forming rings relatively toward each other.

45. In a method of making expansible and collapsible metallic bellows, the steps which include locking a plurality of encircling predeterminately spaced forming rings to a tube by bulges in said tube projecting outwardly from the original cylindrical surface of said tube so that relative movement of said rings is positively prevented prior to the exertion of axial pressure on said tube, and then subjecting said tube to interior fluid pressure and an axial pressure to cause the metal to flow into corrugated form between said rings while said rings move axially toward each other.

46. In a method of making expansible and collapsible corrugated hollow metallic bellows, the steps which include mounting a tubular wall within spaced forming rings positively restraining said rings against axial movement, inducing initial pressure within said wall sufficient to expand the same outwardly between said rings while said rings are held stationary, and then further expanding said wall between said rings while exerting a pressure longitudinally of said wall to collapse said wall and rings.

47. In a method of making metallic bellows from a tube by fluid pressure, the steps which consist in mounting a tube concentrically within a series of spaced axially-movable forming rings rigidly holding said rings against axial movement, initially establishing a fluid pressure within said tube sufficient to expand the tube wall into bulges between said rings, and then maintaining an axial pressure on said tube while permitting said rings to move axially to force the tube into corrugations lying between said rings by the combined action of the interior and axial pressures acting thereon.

48. In a method of making flexible corrugated hollow metallic bellows, the steps which consist in positively spacing and restraining against axial movement, a series of forming rings encircling a tubular wall, inducing an initial pressure within said wall sufficient to bulge the same outwardly between said rings, and thereafter permitting said rings to move axially while further expanding the portions of said wall between said rings.

49. The method of making a corrugated tubular metallic bellows which consists in supporting a tubular blank at spaced intervals throughout its length with a series of rigid encircling supports, bulging the tube between supports while rigidly maintaining the supports in spaced relation, subjecting the tube to an endwise contracting pressure, and sustaining the walls of the tube by an internal fluid pressure while permitting the supports to move toward one another as the tube is contracted in length.

50. In an apparatus of the character described, the combination of a partible die including two series of cooperating partible forming rings, a member movable at right angles to the plane of said rings, means engaging said rings and normally maintaining the same in spaced relation, said means being operatively connected with said movable member and operated to progressively collapse said rings during longitudinal movement of said member.

51. In an apparatus of the character described, the combination of a plurality of axially movable forming rings adapted to encircle a tube, and means adapted to move said rings positively in the direction of the axis of the tube while positively maintaining said rings relatively spaced.

52. In an apparatus of the character described, the combination of a plurality of axially movable forming rings adapted to encircle a tube, means adapted to move said rings positively in the direction of the axis of the tube while maintaining said rings relatively spaced, and means for exerting an end thrust on the said tube during the movement of said forming rings.

53. In an apparatus of the character described, the combination of a plurality of axially movable forming rings adapted to encircle a tube, means adapted to move said rings positively in the direction of the axis of the tube while maintaining said rings relatively spaced, means for exerting an end thrust on the said tube during the movement of said forming rings, and means for synchronizing the movement of said means for producing an end thrust with said means for moving the forming rings.

54. In an apparatus of the character described, the combination of a plurality of axially movable forming rings adapted to encircle a tube, a movable end member mounted to move axially of said forming rings to collapse the tube, and means operated by the movement of said end member for collapsing said rings.

55. In an apparatus of the character described, the combination of a plurality of axially movable forming rings adapted to encircle a tube, a movable end member amounted to move axially to collapse the tube, means adapted to collapse and rings, and means operated by the movement of said end member for simultaneously and synchronously moving said ring collapsing means.

56. In a method of making expansible and collapsible metallic bellows, the steps which include positioning a tubular wall within relatively movable spaced forming rings, applying an internal fluid pressure to said tube to cause said tube to tightly engage said rings and effecting a controlled movement of said forming rings relatively toward each other while maintaining them spaced.

57. In a method of making a metallic bellows in which a relatively deep narrow corrugation is formed to substantially its full depth between axially movable forming rings, the steps which include applying fluid pressure to the interior of said tube and aiding the radial flow of the metal by an axial thrust on said tube while moving the forming rings to maintain a predetermined ratio between the initial and final lengths of the elements of the tube between the lines of contact of the forming rings with the tubes.

FRED K. BEZZENBERGER.